US006883608B2

(12) United States Patent
Parlar et al.

(10) Patent No.: US 6,883,608 B2
(45) Date of Patent: Apr. 26, 2005

(54) GRAVEL PACKING METHOD

(75) Inventors: Mehmet Parlar, Sugar Land, TX (US); Liz Morris, Aberdeen (GB); Yiyan Chen, Richmond, TX (US); Paul A. Price, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/644,429

(22) Filed: Aug. 20, 2003

(65) Prior Publication Data

US 2005/0028978 A1 Feb. 10, 2005

Related U.S. Application Data

(60) Provisional application No. 60/493,212, filed on Aug. 6, 2003, and provisional application No. 60/493,172, filed on Aug. 7, 2003.

(51) Int. Cl.[7] .............................. E21B 43/04; C09K 7/02
(52) U.S. Cl. ........................ 166/278; 166/300; 507/244; 507/240
(58) Field of Search ............................ 166/278, 300, 166/51, 276, 270.1; 507/925, 244, 240

(56) References Cited

U.S. PATENT DOCUMENTS

| | | | | |
|---|---|---|---|---|
| 3,892,275 A | * | 7/1975 | Lybarger et al. | 166/250.01 |
| 4,662,447 A | * | 5/1987 | Bolin | 166/278 |
| 4,725,372 A | * | 2/1988 | Teot et al. | 507/129 |
| 4,735,731 A | * | 4/1988 | Rose et al. | 507/105 |
| 4,945,991 A | | 8/1990 | Jones | 166/278 |
| 5,089,151 A | * | 2/1992 | Hall et al. | 507/240 |
| 5,363,916 A | * | 11/1994 | Himes et al. | 166/276 |
| 5,373,899 A | * | 12/1994 | Dore' et al. | 166/278 |
| 5,551,516 A | * | 9/1996 | Norman et al. | 166/308.2 |
| 5,979,557 A | | 11/1999 | Card et al. | 166/300 |
| 6,218,342 B1 | * | 4/2001 | Patel | 507/129 |
| 6,302,209 B1 | * | 10/2001 | Thompson et al. | 166/305.1 |
| 6,399,546 B1 | * | 6/2002 | Chang et al. | 507/240 |
| 6,435,277 B1 | | 8/2002 | Qu et al. | 166/281 |
| 6,482,866 B1 | | 11/2002 | Dahayanake et al. | 516/77 |
| 6,631,764 B1 | * | 10/2003 | Parlar et al. | 166/278 |
| 2002/0023752 A1 | | 2/2002 | Qu et al. | 166/308 |

FOREIGN PATENT DOCUMENTS

WO    2004/079145    9/2004

OTHER PUBLICATIONS

SPE 38640—*Gravel Packing Horizontal Wellbores with Leak–Off Using Shunts* By L.G.Jones, R.J. Tibbles, L. Myers, David Bryant, Jim Hardin and Gary Hurst.

* cited by examiner

Primary Examiner—Kenn Thompson
(74) Attorney, Agent, or Firm—Thomas O. Mitchell; Robin Nava; Brigitte L. Echols (57) ABSTRACT

A method is disclosed for using aqueous VES-based gravel carrier fluids in gravel packing operations using screens and shunt tubes that have been run into a well completed with an oil-based mud. With this method, the previously necessary but undesirable steps of first running in a perforated liner and then displacing the oil-based mud with an aqueous-based fluid in the region to be gravel packed are both avoided while the advantages of gravel packing with an aqueous-based fluid are retained.

23 Claims, 3 Drawing Sheets

BET-E-40 Surfactant of the Invention

Erucyl Bis(2-Hydroxyethyl) Methyl Ammonium Chloride

GRAVEL PACKING METHOD

CROSS-REFERENCE TO RELATED APPLICATIONS

This application claims the benefit of U.S. Provisional Patent Application No. 60/493,212, filed on Aug. 6, 2003 and U.S. Provisional Application No. 60/493,172, filed on Aug. 7, 2003

BACKGROUND OF THE INVENTION

This invention relates to gravel packing open hole completions in wellbores drilled with oil-based muds (OBM's). In particular it relates to gravel packing such wells with water-based carrier fluids without first displacing the oil-based mud with an aqueous fluid. Most particularly it relates to gravel packing with the alternate path technique while using a viscoelastic fluid as the carrier fluid.

Many wells, especially in oil fields in deep-water/subsea environments, are being drilled with synthetic/oil-based muds. Because of the extremely high cost of intervention and high production rates, these wells require a reliable completion technique that prevents sand production and maximizes productivity throughout the entire life of the well. One such technique is open-hole gravel packing.

There are two principal techniques used for gravel packing open holes: (1) the alternate path technique and (2) the water packing technique. The latter uses low-viscosity fluids, such as completion brines to carry the gravel from the surface and deposit it into the annulus between a sand-control screen and the wellbore. The alternate path technique, on the other hand, utilizes viscous carrier fluids; therefore the packing mechanisms of these two techniques are significantly different. The alternate path technique allows bypassing of any bridges that may form in the annulus, caused by for example high leakoff into the formation due to filtercake erosion, or exceeding the fracturing pressure, or shale-sloughing/shale-swelling or localized formation collapse on the sand control screens.

In unconsolidated formations, sand control measures are implemented to prevent wellbore collapse. Common practice for controlling sand displacement includes placement of a gravel pack to bold formation sand in place. The gravel pack is typically deposited around a perforated liner or screen. The gravel pack filters the sand while still allowing formation fluid to flow through the gravel, the screen and a production pipe. To alleviate the difficulties raised by long or inclined intervals, gravel packing may be carried out with alternate path or "shunt" tools. Such tools include perforated shunts adapted to receive the gravel slurry as it enters the annulus around the screen. These shunts provide alternate paths that allow the gravel slurry to be delivered even if a bridge forms in the gravel before the operation is completed.

Most of the recently discovered deep-water fields contain a high fraction of shales, which are water-sensitive, and thus are (or will be) drilled with oil-based fluids. Although these wells can also be completed with an oil-based gravel packing fluid, all except a few of them to date have been gravel packed with water-based fluids. A very large fraction of them have been completed with viscous fluids using the alternate path technique. Viscoelastic surfactant (VMS) solutions have been the most widely used carrier fluid in open hole gravel packing with the alternate path technique due to their low formation and gravel pack damage characteristics, their low drawdown requirements, their capability of incorporating filtercake cleanup chemicals into the carrier fluid, and their low friction pressures.

However, because viscoelastic surfactant solutions lose their viscosity and elasticity when they are exposed to most oils, including most oil-based-muds, a large degree of uncertainty exists for their successful use as carrier fluids in cases where alternate path screens are run in hole with a wellbore full of oil-based fluids. This is because any fluid displacements that are performed prior to gravel packing do not ensure effective displacement of the oil-based mud with a water-based fluid. Any oil-based mud not displaced may fill at least part of the shunt tubes while the screens are run into the hole. The potential consequence of such an inefficient displacement is a screen-out within the shunt tubes, just when the shunt tubes are needed to bypass any annular bridges. This is because if any oil-based mud is not displaced, the VES gel would contact that oil-based mud. Because it is known that most VES gels break when they contact hydrocarbons, operators would not use VES gels as gravel carrier fluids in situations in which they would contact oil-based muds.

There are two alternatives practiced to avoid this problem. First, is displacement of the entire wellbore to water-based fluids prior to running the alternate path screens in hole. This approach has been practiced successfully in West Africa in more than a dozen wells. A big disadvantage of this approach is that it often requires running a pre-drilled liner to stabilize the wellbore, since displacements to water-based fluids can cause shale swelling and/or collapse, preventing the screens from being run to the target interval, as has been experienced in several wells in the same area. Having to run a pre-drilled liner introduces an additional trip, which is costly (rig time). The second approach is the use of polymer solutions as gravel pack carrier fluids after running alternate path screens in hole with oil-based fluids in the wellbore. Because polymer fluids maintain their viscosity when contaminated with oil-based fluids, this approach eliminates the risk of potential screen-out in the shunt tubes compared to using conventional; viscoelastic surfactant fluids. However, in the event that losses are experienced during gravel packing, polymer fluids invading the formation are damaging and well productivity suffers. Note that such losses would occur only if the filtercake lift-off or erosion occurs or if the fracturing pressure of the formation is exceeded, any of which result in activation of the shunt tubes; i.e., shunt tubes would not be needed if the filtercake remains intact and the pressure in the open hole section remains below fracturing pressure.

Thus, it would be highly desirable to have a gravel packing method using a viscoelastic surfactant carrier fluid that was insensitive to the oil-based mud system that was used to drill the reservoir, at any ratio of oil to mud, meaning that they can maintain sufficient viscosity to perform the gravel packing at least within the time frame of placing the gravel, but would break upon contact with the produced hydrocarbons, at least within the time frame of putting the well on production after gravel packing. It would also be desirable to have a method of gravel packing an open hole completion that had been drilled with an OBM with a "less insensitive" aqueous VES gravel packing carrier fluid that may be more available or less expensive. Less insensitive aqueous VES gravel packing carrier fluids are those that are sufficiently stable long enough to carry gravel in the presence of OBM's at many, but not all, OBM/VES ratios under the conditions of the treatment. The term less insensitive aqueous VES gravel packing carrier fluids is also used for those VES fluids that are less stable to higher temperatures or higher salt concentrations than are insensitive VES fluids.

SUMMARY OF THE INVENTION

One embodiment of the present Invention is a method for using selected aqueous VES fluids as carrier fluids for placing gravel in open holes that have been completed with oil-based muds and in which alternate path screens with shunt tubes have been run into the open hole without previously displacing the OBM. A critical aspect of the Invention is that a VES fluid and OBM are selected such that the VES is more stable to the mud than to the produced hydrocarbons; the VES is stable in the mud for long enough to place the gravel under the conditions of the job, but the VES is broken by the produced hydrocarbons in a time short enough under the conditions of the job to provide suitable clean-up during flow-back. For those aqueous VES gravel packing carrier fluids that are insensitive to oil-based muds under the gravel packing conditions, this embodiment of the Invention does not require displacement of the oil-based muds used in the completion prior to the gravel packing. In this embodiment, an interval of an open hole wellbore penetrating a subterranean formation is gravel packed with the steps of drilling the wellbore into the formation with a drill string and an oil-based mud; pulling out the drill string; running a sand control string having one or more screens and one or more alternate path shunt tubes into the wellbore containing the oil-based mud; setting a packer at or near the location at which the wellbore penetrates the formation; gravel packing with an aqueous viscous viscoelastic surfactant based carrier fluid that is present in an amount effective to provide viscosity sufficient to carry the gravel but that is insensitive to the oil-based mud for a time sufficient to place the gravel and that is broken in the presence of produced fluid; and producing fluid from the wellbore. This embodiment may also be used with less insensitive aqueous VES gravel packing carrier fluids at sufficiently low temperatures that the VES is stable in the mud for long enough to place the gravel under the conditions of the job. The interval to be completed is typically, but not limited to, a highly deviated or horizontal interval, and the oil-based mud is typically but not limited to an invert emulsion oil-based mud.

Depending upon the conditions, the insensitive aqueous VES gravel packing carrier fluid contains an effective amount of a surfactant that is a quaternary ammonium salt of an amine corresponding to the formula in which $R_1$ is at least about a $C_{16}$ aliphatic group which may be branched or straight chained and which may be saturated or unsaturated; $R_2$, $R_3$, and $R_4$ are each independently, a $C_1$ to about $C_6$ aliphatic group which can be branched or straight chained, saturated or unsaturated and which may be substituted with a group that renders the $R_2$ or $R_3$ group more hydrophilic; none of $R_1$, $R_2$, $R_3$ or $R_4$ is hydrogen, and the $R_2$, $R_3$ and $R_4$ groups may be formed into a heterocyclic 5- or 6-member ring structure which includes the nitrogen atom of the amine, and X is an inorganic anion. Preferably the quaternary ammonium salt of an amine is erucyl bis(2-hydroxyethyl) methyl ammonium chloride. The insensitive aqueous VES gravel packing carrier fluid may also contain an effective amount of a surfactant that has the following amide structure:

in which $R_1$ is a hydrocarbyl group that may be branched or straight chained, aromatic, aliphatic or olefinic and has from about 14 to about 26 carbon atoms and may contain an amine; !$R_2$ is hydrogen or an alkyl group having from 1 to about 4 carbon atoms; $R_3$ is a hydrocarbyl group having from 1 to about 5 carbon atoms; and Y is an electron withdrawing group. Preferably the electronic withdrawing group is a quaternary amine or an amine oxide. More preferably the surfactant is a betaine having the structure:

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Even more preferably the surfactant is a betaine in which R is $C_{17}H_{33}$ or $C_{21}H_{41}$, and n=3 and p=1; these are called BET-O-30 and BET-E-40 respectively. Most preferably the surfactant is BET-E40. Depending upon the conditions, the quaternary amine surfactants described above may sometimes be used and the betaine surfactants described above may always be used in this embodiment.

In another embodiment, if the aqueous VES gravel packing carrier fluids are less insensitive to oil-based muds, under the conditions and for the time required for the gravel packing, and if the conditions are too severe for a method without displacement of any of the oil-based mud to be suitable, then the method requires a simple displacement that does not have to be total. In this embodiment, a VES fluid and OBM are selected such that the VES is stable to the mud for long enough to place the gravel under the conditions of the job at most mud/VES ratios, but not necessarily at all ratios, and the VES is broken by the produced hydrocarbons in a time short enough under the conditions of the job to provide suitable clean-up during flow-back. In this embodiment, the OBM within the sand control string is at least partially displaced by an aqueous hydroxyethyl cellulose solution or other fluid, examples of which are an aqueous xanthan solution and an aqueous clarified xanthan solution, which is known to be non-damaging and insensitive to contamination with oil-based fluids and therefore is not subject to the viscosity loss that would otherwise result from contamination of the VES with the OBM. This step is performed after setting the packer and before the gravel packing step. Optionally, instead of or in addition to this step, the aqueous hydroxyethyl cellulose solution or other fluid, such as an aqueous xanthan solution or an aqueous clarified xanthan solution, which is known to be non-damaging and insensitive to contamination with oil-based fluids and therefore is not subject to the viscosity loss that would otherwise result from contamination of the VES with the OBM nay be used as the prepad in the gravel packing step. This method causes a less insensitive aqueous VES gravel packing carrier fluid to function as well as an insensitive aqueous VES gravel packing carrier fluid in the method. The quaternary amine surfactants described above and the betaine surfactants described above may always be used in this embodiment and its variations. The interval to be completed is typically, but not limited to, a highly deviated or horizontal interval, and the oil-based mud is typically but not limited to an invert emulsion oil-based mud.

In other embodiments, gravel packing may be performed above fracture pressure; such a treatment is also known as frac-packing. Perforated liners are not needed in any embodiments of the Invention. In other embodiments, although the insensitive and less insensitive aqueous VES gravel packing carrier fluids are stable to oil-based muds for a long enough time to place the gravel, they do break in the presence of oil-based muds under the influence of time and temperature after the gravel packing has been completed and thus aid in effective clean up.

DETAILED DESCRIPTION OF THE INVENTION

In the recovery of hydrocarbons from subterranean formations, horizontal or highly deviated wells are a proven method of maximizing hydrocarbon productivity (in this document, the term "horizontal wells" is also meant to include highly deviated wells). Also, in some instances, reservoir formations are so thick that vertical or deviated wellbores that are not necessarily highly deviated may penetrate them for long distances. Many such wells (through thick formations, or completed horizontally) are not cased because the uncased completion cost is much lower than that of cased-hole wells and productivities of uncased holes are commonly much higher than those of cased holes. In unconsolidated formations however, sand control measures need to be implemented to prevent wellbore collapse, sand production, and hardware failure and to optimize well deliverability.

In unconsolidated formations, sand control measures are implemented to prevent wellbore collapse. A very common practice in the oil and gas industry for controlling sand migration into wells penetrating loosely consolidated formations includes placement of a gravel pack to hold formation sand in place. The gravel pack is typically deposited around a perforated liner or screen. The gravel pack filters out the sand while still allowing formation fluid to flow through the gravel, the screen and a production pipe to the surface.

In the remainder of this discussion reference will be made to horizontal wells, but it is to be understood that the discussion applies to vertical or deviated wells as well. One method of horizontal gravel packing is water packing, a two-stage process using a low concentration of gravel in brine. In a first wave, called the α wave, with gravel moving toward the far end, or "toe" of the horizontal section, the lower section of the well is packed until either the toe is reached or a premature screen-out occurs. The premature screen-out is due to the formation of a bridge due to increased leakoff rates and thus decreased return rates. Then, the top section of the well is packed by the second or β wave, with packing proceeding back toward the beginning of the horizontal section, the "heel". Water packing mainly relies on the ability to maintain high circulation rates. Indeed gravel transport essentially depends upon flow velocity and turbulent flow rather than fluid viscosity. Therefore the success of gravel placement in water packing relies in part on the existence of a low-permeability filter cake that minimizes losses of gravel packing fluids. Fracturing must be avoided at all costs in such an operation. Otherwise, a catastrophic loss of gravel pack fluid occurs, resulting in the formation of a bridge and incomplete packing below the bridge. Bearing in mind that intervals as long as 3,000 meters or more may have to be gravel packed in horizontal wells, the formation of a bridge near the heel of the interval (the portion of the interval closest to the surface of the wellbore) could result in a dramatic decrease in the well productivity.

To alleviate the difficulties raised by water packing long or inclined intervals, the second popular method for gravel packing open hole completions uses a viscous carrier fluid for the gravel. Specific techniques and conditions for pumping a gravel pack slurry composition into an open hole wellbore are known to persons skilled in this field. "Alternate path" tools are used. The alternate path technology incorporates a special gravel pack screen system that contains perforated "shunt-tubes" or alternate flow paths, attached to the sides of the screen. The perforated shunts are adapted to receive the gravel slurry as it enters the annulus around the screen. These shunt tubes permit effective gravel packing by allowing the fluid to flow around a bridged zone if gravel bridging should occur before the operation is completed. Thus even long horizontal sections can be gravel packed even if there is high fluid loss. A complete description of a typical alternate-path gravel pack tool and how it operates can be found for instance in U.S. Pat. No. 4,945,991, hereby incorporated by reference in its entirety. Several improvements to the operation technique and to the tools have been proposed for instance in U.S. Pat. Nos. 5,082,052; 5,113,935; 5,341,880; 5,419,394; 5,435,391; 5,476,143; 5,515,915 and 6,220,345.

Unlike water packing, gravel packing with the shunt technique proceeds from heel to toe. In fact the packing with this technique takes place with successive formation of bridges, but these bridges are anticipated by, and even used to advantage by, the design of the tool. Once a segment of screen/formation annulus and the shunt ports serving that section are packed, diversion of slurry, carried by the still-viscous fluid into the next segment of shunt tubes, occurs due to high resistance to flow in the packed shunt ports. Thus, the success of gravel packing with this technique is controlled by the resistance to slurry flow through the shunt ports, and is independent of either the formation properties or the existence of a filtercake. Most importantly, the technique requires the carrier fluid to be and to remain sufficiently viscous during the treatment so that it can transport gravel at the much lower flow rates used (relative to water packing). If the carrier fluid loses its viscosity, the process will fail. It is to be understood that gravel packing typically includes the steps of injecting a prepad and a postpad and that when gravel packing with viscous carrier fluids, the prepad and postpad are typically, but not always, the same fluid as the carrier fluid, without the gravel.

Although there are many advantages to using viscoelastic surfactant (VES) based aqueous fluids as gravel packing carrier fluids, because of the concern that VES fluids would break if they come into contact with oil-based muds (OBM's), especially in alternate path shunt tubes, polymer based fluids have generally been used. In the past, if it was desired to use VES based carrier fluids, elaborate steps were taken to avoid any contact between the VES fluid and the OBM. The major steps in used in one method of open hole gravel packing with VES fluids and shunt tubes have been as follows. (It is to be understood that not all steps are included here and that one skilled in the art will know the additional steps that are necessary or optional in such a treatment.)

1. Drill to the top of the target reservoir using an OBM.
2. Run in casing and cement in place.
3. Drill the reservoir with an OBM.
4. Pull the drill string.
5. Run in a predrilled liner to stabilize the wellbore against collapse.
6. Displace the OBM from the bottom up, typically to an aqueous hydroxyethyl cellulose solution or to another fluid, such as an aqueous xanthan solution or an aqueous clarified xanthan solution, which is known to be non-damaging and insensitive to contamination with oil-based fluids and therefore is not subject to the viscosity loss that would result from breaking caused by the OBM, to the packer setting depth, which is typically in the casing above the target reservoir.
7. Pull the string up and displace the casing to brine to or near to the surface.
8. Run alternate path screens into the predrilled liner. Do not use a shroud, as is typically used to protect alternate path screens for open hole completions. A shroud is not used because the predrilled liner is present.
9. Set a packer.
10. Perform circulation tests with the VES fluid to be used in the gravel packing.
11. Gravel pack with the aqueous VES-based carrier fluid, with a prepad ahead and a postpad behind the VES/gravel slurry, with both pads being the same VES fluid as used in the gravel packing but without gravel.

The main disadvantage of this procedure is the necessity of running in the predrilled liner and then running in the screens and shunt tubes in a subsequent step (instead of running in screens and shunt tubes in a shroud in a single step). The multi-step procedure must be done so that the OBM can be replaced with an aqueous fluid without the hole being damaged but without the shunt tubes in place. If the single step procedure was done in the past in an OBM the shunt tubes and the base pipe would be filled with the OBM which would then break the VES in the attempt to gravel pack.

Now a method has been developed using one of two types of VES-based carrier fluids to avoid the problems previously encountered with attempts to use alternate path technology with aqueous VES gravel packing carrier fluids in wells completed with oil-based muds. Insensitive and less insensitive aqueous VES gravel packing carrier fluids have been identified, and methods have been developed that use these fluids. Insensitive and less insensitive aqueous VES gravel packing carrier fluids were defined above.

In one embodiment (hereinafter termed the first main embodiment), the method uses an aqueous VES gravel packing carrier fluid that is insensitive to OBM's. In such a case, the sand control string with the alternate path shunt tubes with shroud is run directly into an open hole containing the OBM. This method leaves out the step of running in a predrilled liner and also leaves out the steps of displacing the OBM.

The key element is that the sand control screens are run in hole with oil-based fluids in the hole. A typical job using this embodiment is run as follows, although many variations lie within the scope of the methods of the Invention and it is to be understood that not all steps are included here and that one skilled in the art will know the additional steps that are necessary or optional in such a treatment:

1. Drill to the top of the target reservoir using an OBM.
2. Case and cement to above the reservoir section top hole. This step can optionally be done after the reservoir is drilled, setting the casing above the reservoir.
3. Drill the reservoir with an OBM.
4. Optionally condition the OBM by passing it through shaker screens with smaller openings to fix the maximum particle size in the OBM and thus prevent subsequent plugging of the sand control screens with particles in the OBM.
5. Optionally displace the open hole (and the cased hole if economics allows; i.e., not very large volumes are required) with a solids-free oil-based fluid up to some level in the casing (typically above the packer setting depth).
6. Pull out of the hole with the drill string.
7. Run in hole with the sand control string of screens, shunt tubes and shroud.
8. Set a packer.
9. Optionally, but preferably, displace the oil-based fluid out of the drill pipe and into the casing/drill-pipe annulus using the insensitive VES fluid of the Invention in reverse position. Whether or not this is done depends upon the logistics (having separate tanks for fluid storage and mixing).
10. Switch to the gravel pack position.
11. Using an insensitive VES fluid of the Invention, pump a VES prepad, the VES/gravel slurry and a VES postpad (pre and post-pads are VES fluids only and do not contain gravel) down through the drill pipe into the open hole and typically (but not necessarily) taking returns up through the wash pipe and the casing/drill-pipe annulus.

This method is successful because, although the procedure is not intended to guarantee prevention of contact of the VES fluid and the OBM, it is sufficient to decrease the potential, contact to the extent that it is safe for use with insensitive VES systems. With an insensitive VES it is acceptable to permit the possibility of such contact.

Non-limiting examples of appropriate surfactants useful in making insensitive viscoelastic surfactant gels, suitable for the Invention, can be found in U.S. Pat. No. 6,482,866, U.S. Pat. No. 6,435,277, and U.S. patent application No. 2002/0023752, all of which are hereby incorporated in their entirety, and all of which are assigned to the same assignee as the present Invention. These materials may also contain co-surfactants, salts, low-molecular weight alcohols and other additives to enhance gel strength and stability, as described in the above references. One valuable property is that they are insensitive to salt concentrations and can be used in water ranging from fresh water to heavy brines. (BET-O-30 (see below) does not gel in heavy brines without a co-surfactant such as sodium dodecylbenzene sulfonate.) Additionally, they may also contain other appropriate oilfield fluid additives such as iron control additives, antioxidants, anti-sludge agents, corrosion inhibitors, clay control agents, flow enhancers and scale inhibitors. They may be foamed, for example with nitrogen. As with all oilfield treatment fluids, surfactants and additives should always be tested to ensure that the fluids perform as desired and that the additives will not interfere with the performance or cause problems before, during, or after the treatment. Such testing is well known to those of skill in the art.

Preferred surfactants have the following amide structure:

in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 5 carbon atoms; and Y is an electron withdrawing group. Preferably the electronic withdrawing group is a quaternary amine or an amine oxide.

More preferably the surfactant is a betaine having the structure:

in which R is a hydrocarbyl group that may be branched or straight chained, aromatic, aliphatic or olefinic and has from about 14 to about 26 carbon atoms and may contain an amine; n=about 2 to about 4; and p=1 to about 5, and mixtures of these compounds. Even more preferably the surfactant is a betaine in which R is $C_{17}H_{33}$ or $C_{21}H_{41}$, and n=3 and p=1; these are called BET-O-30 and BET-E40 respectively. Most preferably the surfactant is BET-E-40.

Figure 1:
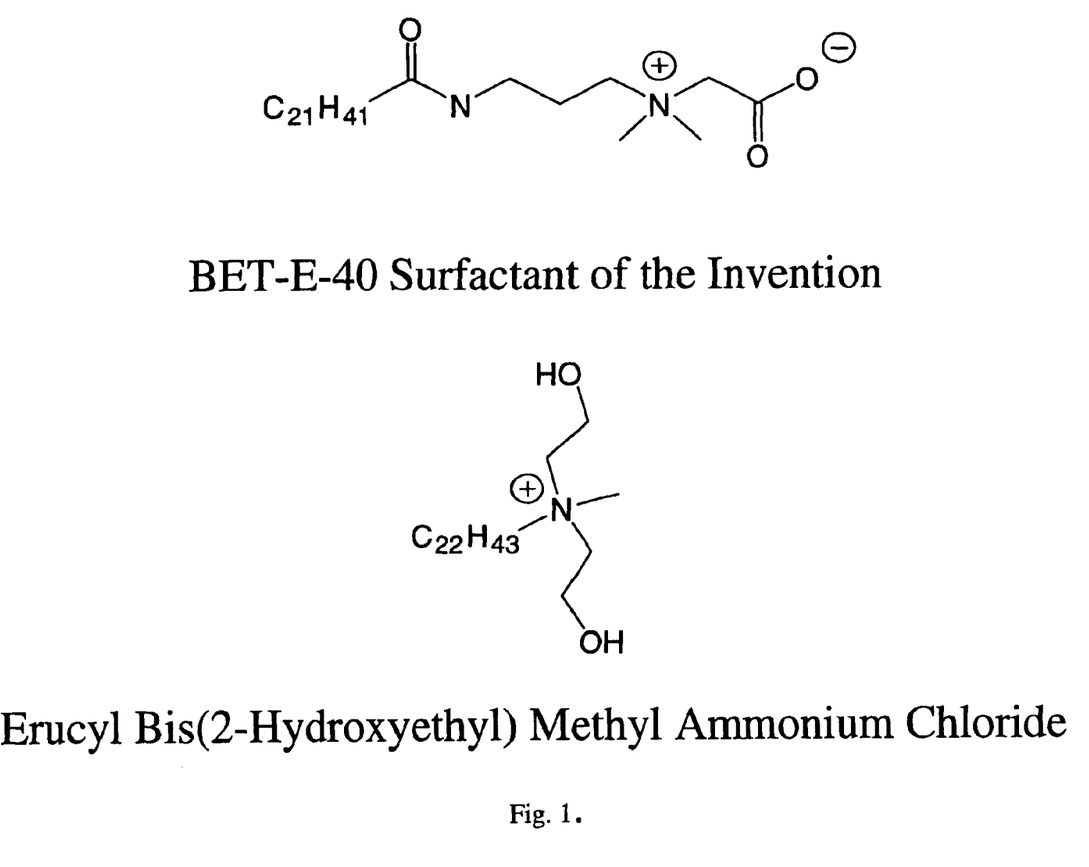
FIG. 1 shows the structure of surfactants useful in methods of the Invention.

As non-limiting examples, BET-O-30 and BET-E40 zwitterionic surfactants have been found to be particularly useful in forming insensitive VES's in any electrolyte concentration; these materials will form gels with no added salt or even in heavy brines. BET-O-30 is so designated because as obtained from the supplier (Rhodia, Inc. Cranbury, N.J., U.S.A.) it is called Mirataine BET-O-30 because it contains an oleyl acid ester group (including a $C_{17}H_{33}$ tail group) and contains about 30% active surfactant; the remainder is substantially water, a small amount of sodium chloride, and isopropanol. The analogous material, BET-E-40, is also available from Rhodia and contains a erucic acid ester group (including a $C_{21}H_4$, tail group) and is 40% active ingredient, with the trender again substantially water, a small amount of sodium chloride, and isopropanol. BET-ERA is shown in FIG. 1. The surfactants are supplied in this form, with an alcohol and a glycol, to aid in solubilizing the surfactant in water at these high concentrations, and to maintain the as-received concentrate as a homogeneous fluid at low temperatures. In field use, after dilution, the amounts of the other components of the as-received materials are insignificant. BET surfactants, and others, are described in U.S. Pat. No. 6,482,866. The preferred VES surfactant concentration range in the present Invention is from about 5 to about 15 volume per cent.

Another embodiment of the Invention, that we may term the second main embodiment, also leaves out the step of running in a predrilled liner and the steps of displacing the OBM in the open hole and the casing before running in the alternate path screens and uses "less insensitive" aqueous VES gravel packing carrier fluids. Less insensitive aqueous VES gravel packing carrier fluids are those that are stable in the presence of OBM's at many, but not all, OBM/VES ratios under the conditions of the treatment. Less insensitive aqueous VES gravel packing carrier fluids might be insensitive at lower temperatures or loser salinities but less insensitive at higher temperatures or higher fluid densities. This second main embodiment includes a step that will minimize, but not necessarily eliminate, contact between the VES and the OBM by displacing the OBM from the sand control string. The major steps are as follows and again it is to be understood that not all steps are included here and that one skilled in the art will know the additional steps that are necessary or optional in such a treatment.

1. Drill to the top of the target reservoir using an OBM.
2. Run in casing and cement in place. This step can optionally be done after the reservoir is drilled, setting the casing above the reservoir.
3. Drill the reservoir with an OBM.
4. Pull out the drill string.
5. Run in alternate path screens and shunt tubes with a shroud.
6. Set the packer.
7. Displace the OBM to an aqueous hydroxyethyl cellulose solution or other fluid, such as an aqueous xanthan solution or an aqueous clarified xanthan solution, which is; known to be non-damaging and insensitive to oil-based fluids contamination (or use the aqueous hydroxyethyl cellulose solution or the like as a pre-pad) in the gravel pack position down through the drill pipe into the open hole and typically (but not necessarily) taking returns up through the wash pipe and casing/drill-pipe annulus.
8. Using a less insensitive VES fluid of the Invention, pump a VES prepad (unless the option of using the non-damaging fluid as a prepad was selected in step 7), the VES/gravel slurry and a VES postpad (pre and post-pads are viscous fluids only and do not contain gravel) down through the drill pipe into the open hole and typically (but not necessarily) taking returns up through the wash pipe and the casing/drill-pipe annulus.

This second main embodiment also leaves out the optional steps of the first main embodiment of conditioning the OBM or replacing it with a solids-free oil-based fluid.

Insensitive aqueous VES gravel packing carrier fluids may be used in this second main embodiment if desired. Note that this second main embodiment effectively allows a less insensitive surfactant system to behave as though it were an insensitive surfactant system.

Furthermore, we have found that less insensitive aqueous VES gravel packing carrier fluids that are too sensitive to be used in the first main embodiment at elevated temperatures can be used in the first main embodiment at lower temperatures. For example, although it would not be recommended to use a less insensitive aqueous VES gravel packing carrier fluid in which the VES is erucyl bis(2-hydroxyethyl) methyl ammonium chloride in the first main embodiment at temperatures above about 65° C. it is suitable to use such a fluid at temperatures below about. 65° C. Since the loss of viscosity of the VES fluids upon contamination with oil-based fluids is also time dependent, such VES systems as erucyl bis(2-hydroxyethyl) methyl ammonium chloride can also be used in shorter intervals, which can be treated in less time. The length of the interval that can be treated with a less insensitive aqueous VES gravel packing carrier fluid is dependent on the bottom hole temperature.

Non-limiting examples of appropriate surfactants useful in making less insensitive aqueous VES gravel packing carrier fluids suitable for the Invention are described in U.S. Pat. No. 6,435,277, assigned to the same assignee as the present Invention and hereby incorporated in its entirety. Suitable less insensitive surfactants are the anionic, cationic, and nonionic surfactants described in that patent from column 20, line 1, to column 23, line 29. That patent gives suitable concentrations, and describes suitable and compatible additives, in particular salts, alcohols and co-surfactants that may be added to improve stability. Preferred less insensitive surfactants are the cited cationic surfactants; more preferred are quaternary ammonium salts of certain amines as described in U.S. Pat. No. 5,979,557, assigned to the same assignee as the present Invention and hereby incorporated in its entirety. Examples are quaternary ammonium salts of the amine corresponding to the formula wherein $R_1$ is at least about a $C_{16}$ aliphatic group which may be branched or straight chained and which may be saturated or unsaturated, $R_2$, $R_3$, and $R_4$ are each independently, a $C_1$ to about $C_6$ aliphatic group which can be branched or straight chained, saturated or unsaturated and which may be substituted with a group that renders the $R_2$ or $R_3$ group more hydrophilic, none of $R_1$, $R_2$, $R_3$ or $R_4$ is hydrogen, and the $R_2$, $R_3$ and $R_4$ groups may be formed into a heterocyclic 5- or 6-member ring structure which includes the nitrogen atom of the amine, and X is an inorganic anion. A most preferred less insensitive surfactant is erucyl bis(2-hydroxyethyl) methyl ammonium chloride.

These aqueous VES gravel packing carrier fluids may also contain co-surfactants, salts, low-molecular weight alcohols and other additives to enhance gel strength and stability. Additionally, they may also contain other appropriate oilfield fluid additives such as iron control additives, antioxidants, anti-sludge agents, corrosion inhibitors, clay control agents, flow enhancers and scale inhibitors. They may be foamed, for example with nitrogen. The preferred VES surfactant concentration range for the less insensitive surfactants in the aqueous VES based gravel packing fluids in the present Invention is from about 5 to about 15 volume percent.

The methods of the Invention may be used with all oil-based muds. Whether or not an aqueous VES gravel packing carrier fluid is insensitive or less insensitive to the mud will depend upon the mud composition and additives, the VES fluid composition and additives, the conditions, and the time of the treatment. Whether or not an aqueous VES gravel packing carrier fluid is insensitive or less insensitive to the mud may be determined by simple laboratory experiments as would be recognized by one skilled in the art. Preferred muds are oil-based emulsion mud systems (also called "inverse mud" systems). A suitable OBM is commercially available as VERSAPRO from M-1 Drilling Fluids, Houston, Tex., U.S.A. VERSAPRO is described by the supplier as an oil-based reservoir drill-in fluid system having an emulsifier package such that the calcium chloride brine it contains forms colloid-sized droplets that are emulsified in a continuous oil phase. VERSACLEAN (also commercially available from M-I Drilling Fluids) can also be used. VERSACLEAN is described by the supplier as a mineral-oil system for environmentally sensitive areas where diesel is prohibited. VERSACLEAN is believed to have an oil/water ratio of 80120 and to contain 225,000 ppm $CaCl_2$. The nature of the brine in an invert emulsion oil-based mud when used in methods of the current Invention is not important. Another suitable oil-based mud is CARBOSEA, commercially available form Baker Hughes Inteq, Houston, Tex., U.S.A., and described by them as a low-toxicity oil-based mud.

Figure 2:
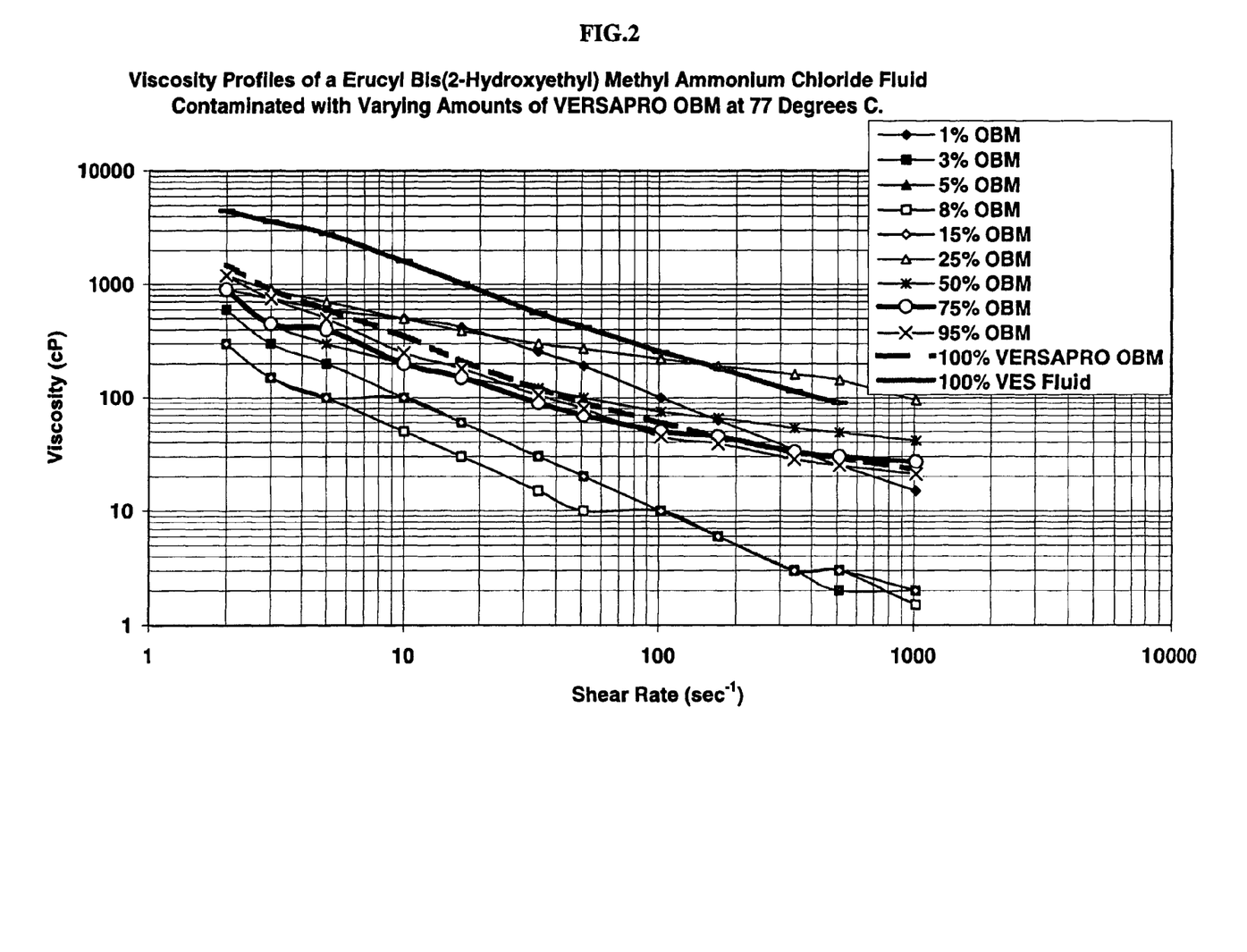
FIG. 2 shows the viscosity of a viscoelastic fluid made with one suitable surfactant in varying amounts of an oil-based mud.
Figure 3:
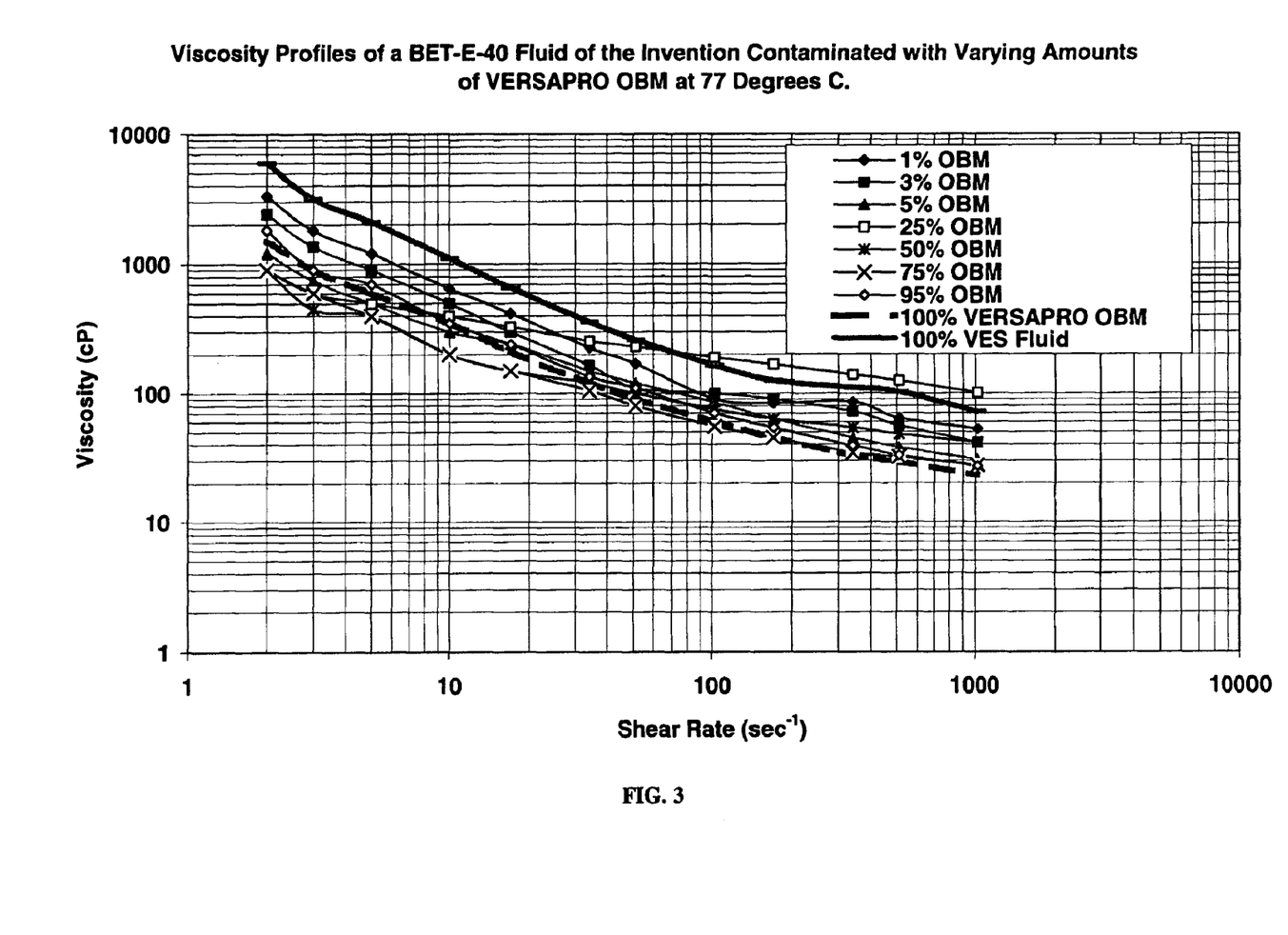
FIG. 3 shows the viscosity of a viscoelastic fluid made with another suitable surfactant in varying amounts of an oil-based mud.

Two series of tests were conducted, one with a less insensitive VES fluid of the Invention, containing 5 volume percent erucyl bis(2-hydroxyethyl) methyl ammonium chloride available from Ondeo-Nalco Energy Services, Sugar Land, Tex., U.S.A. (containing about 60% active ingredient, 5% water, and about 25% lower alcohols and glycols to provide low temperature stability) and 4 weight percent potassium chloride, and another with an insensitive VES fluid of the Invention, containing 7.5 volume percent as-received BET-E40 and 9.8 ppg (pounds per gallon) (1.17 kg/L) $CaCl_2$. About 5 weight percent sodium chloride and about 1 weight percent of a sulfonated polyelectrolyte viscosity recovery enhancer was first added to the as-received BET-E-40 concentrate. For each series of tests, each fluid was contaminated with an oil-based mud (OBM) sample (commercially available as VERSAPRO from M-I Drilling Fluids) at various volumetric ratios. The rheologies of these samples were measured and compared to the uncontaminated VES and OBM samples at 170° F. (77° C.). In each experiment, the VES fluid and the OBM were heated separately to 170° F. (77° C.); they were then combined in bottles, shaken vigorously by hand for 30 seconds, and the viscosity was measured in a Fann 35 viscometer. The results are shown in FIGS. 2 and 3 for mixtures with the less insensitive erucyl bis(2-hydroxyethyl) methyl ammonium chloride VES fluid and for mixtures with the insensitive VES fluid the BET-E40 VES fluid, respectively.

As can be seen, at this temperature the less insensitive VES erucyl bis(2-hydroxyethyl) methyl ammonium chloride fluid experiences a substantial viscosity loss at several ratios of mixing with the OBM, and the viscosity of the insensitive VES BET-E-40 fluid is maintained to a large extent at all ratios tested. This is particularly important because in a method in which a VES fluid displaces an OBM, many ratios of VES fluid to OBM could be expected to be encountered. Thus for a method like the first main embodiment of the Invention to be successful, the OBM should not break the VES fluid (in the time needed for the fluid to place gravel) at any ratio. For a method like the second main embodiment, the OBM should not break the VES fluid (in the time needed for the fluid to place gravel) at most ratios. These data show that the erucyl bis(2-hydroxyethyl) methyl ammonium chloride fluid might break unless at least a portion of the OBM had previously been displaced by a fluid insensitive to the OBM. Therefore, under the conditions of the experiment it should be used only in the second main embodiment of the Invention. Of course, under different conditions or with suitable steps taken to improve its stability, this fluid could be an insensitive fluid. Such steps could be the addition of a stabilizing additive such as a co-surfactant, an increase in the surfactant concentration, a change in the electrolyte concentration or others known to those skilled in the art and readily testable with laboratory experiments. Under the conditions of the experiment, the BET-E40 based VES fluid is an insensitive fluid and would be suitable in the first main embodiment of the Invention, because it would not be broken by the OBM during the time needed for the fluid to place gravel at any ratio. Naturally, it would also be suitable in the second main embodiment of the Invention.

In another experiment, tests were run with an aqueous VES gravel packing carrier fluid containing 10 volume percent erucyl bis(2-hydroxyethyl) methyl ammonium chloride available from Ondeo-Nalco Energy Services, Sugar Land, Tex., U.S.A. (containing about 60% active ingredient, 5% water, and about 25% lower alcohols and glycols to provide low temperature stability) and 4 weight percent potassium chloride. For each series of tests, this fluid was contaminated with CARBOSEA oil-based mud at various volumetric ratios ranging from 1 to 75% at 185° F. (85° C.). The rheologies of these samples were measured and compared to the uncontaminated VES fluid and CARBOSEA samples at 185° F. (85° C.). In each experiment, the VES fluid and the CARBOSEA were heated separately to 185° F. (85° C.); they were then combined in bottles, shaken vigorously by hand for 30 seconds, and the viscosity was measured in a Fann 35 viscometer. This VES fluid was found to be a less insensitive aqueous VES gravel packing carrier fluid when used with this OBM at this temperature.

Shown in Table 1 are results of compatibility testing with a crude oil sample, using the insensitive BET-E40 VES fluid. As seen, the BET-E40 VES fluid breaks completely when exposed to the crude oil, as does the less insensitive erucyl bis(2-hydroxyethyl) methyl ammonium chloride fluid (not shown). This is important because in the methods of the Invention, the VES fluid should break when in contact with crude oil as the well is flowed back to effect clean-up of the completion, especially of the gravel pack. In experiments not shown, it was found that aqueous VES gravel packing carrier fluids made with less insensitive VES's such as erucyl bis(2-hydroxyethyl) methyl ammonium chloride also break completely when exposed to the same crude oil.

Although the insensitive and less insensitive aqueous VES gravel packing carrier fluids are stable to oil-based muds for a long enough time to place the gravel using the appropriate method embodiment of the Invention, in other experiments, not shown here, we have found that they may break under certain conditions of time, temperature and VES/OBM ratio in the presence of oil-based muds at times greater than those necessary to complete the gravel pacing. Although this is not necessary, it aids in the clean up of the gravel pack. This delayed breaking of the VES by the OBM, when and if it does occur, is an advantage, not a disadvantage.

Thus, it is possible to use the VES fluid of method embodiments of the Invention as a carrier fluid in environments where the alternate path screens are run in hole in oil-based muds (i.e., without prior displacements to water-based fluids) and to maintain the efficiency and productivity benefits associated with these types of aqueous non-polymeric gravel carrier fluids. In summary, under very mild conditions of low temperatures and/or short intervals, less insensitive aqueous VES gravel packing carrier fluids may be used in the first main embodiment of the Invention. Under more severe conditions, less insensitive aqueous VES gravel packing carrier fluids may be used with the addition of the single, simple, step of first displacing they OBM to an aqueous hydroxyethyl cellulose solution or other fluid, such as an aqueous xanthan solution or an aqueous clarified xanthan solution, which is known to be non-damaging and insensitive to oil-based fluids contamination (or use the aqueous hydroxyethyl cellulose solution or the like as a pre-pad) in the gravel pack position down through the drill pipe into the open hole and typically (but not necessarily) taking returns up through the wash pipe and casing drill-pipe annulus (the second main embodiment). Under severe conditions, insensitive aqueous VES gravel packing carrier fluids must be used in either of these main embodiments. Insensitive aqueous VES gravel packing carrier fluids may be used under any conditions in either of these main embodiments. As has been said, one skilled in the art could employ many optional variations on the main methods as described and the methods would still fall within the scope of the Invention, and simple laboratory experiments such as those described above can be used to determine whether a specific VES-based carrier fluid will be insensitive or less insensitive under the intended conditions of use.

Although the methods are described here and most typically used for hydrocarbon production, they may also be used in injection wells and for production of other fluids such as water or brine, carbon dioxide, or helium.

TABLE 1

Compatibility Testing of BET-E-40 VES Fluid with Crude Oil at 170° F. (77° C.).

| VES Fluid | 1.17 kg/L CaCl$_2$ + 7.5% BET-E-40 | | |
|---|---|---|---|
| Oil/VES Fluid Ratio | 25/75 | 50/50 | 75/25 |
| Time (mins) | % Breakout of Oil Phase | | |
| 1 | 25% | 20% | 100% |
| 3 | 25% | 30% | 100% |
| 5 | 50% | 30% | |
| 10 | 50% | 50% | |
| 15 | 50% | 50% | |
| 30 | 50% | 70% | |
| 60 | 100% | 100% | |
| VES Fluid | Broken after 1 min | Broken after 1 min | Broken after 1 min |
| Emulsion Formed | NO | NO | NO |
| Sludge Formed | NO | NO | NO |

What is claimed is:

1. A method of completing an interval of an open hole wellbore penetrating a subterranean formation comprising the steps of:

a. drilling the wellbore into the formation with a drill string and an oil-based mud, b. pulling out the drill string, c. running a sand control string comprising one or more screens and one or more alternate path shunt tubes into the wellbore containing the oil-based mud, d. setting a packer at or near the location at which the wellbore penetrates the formation, e. gravel packing with an aqueous viscous viscoelastic surfactant based carrier fluid, said viscoelastic surfactant present in an amount effective to provide viscosity sufficient to carry the gravel, said carrier fluid being insensitive to the oil-based mud for a time sufficient to place the gravel and said carrier fluid being capable of being broken by produced fluid, and f. producing fluid from the wellbore.

2. The method of claim 1 wherein the wellbore is horizontal or highly deviated.

3. The method of claim 1 wherein the oil-based mud is an invert emulsion oil-based mud.

4. The method of claim 1 wherein the viscous viscoelastic surfactant based carrier fluid comprises an effective amount of a quaternary ammonium salt of the amine corresponding to the formula wherein $R_1$ is at least about a $C_{16}$ aliphatic group which may be branched or, straight chained and which may be saturated or unsaturated, $R_2$, $R_3$, and $R_4$ are each independently, a $C_1$ to about $C_6$ aliphatic group which can be branched or straight chained, saturated or unsaturated and which may be substituted with a group that renders the $R_2$ or $R_3$ group more hydrophilic, none of $R_1$, $R_2$, $R_3$ or $R_4$ is hydrogen, and the $R_2$, $R_3$ and $R_4$ groups may be formed into a heterocyclic 5- or 6-member ring structure which includes the nitrogen atom of the amine, and $X^-$ is an inorganic anion.

5. The method of claim 4 wherein said viscous viscoelastic surfactant based carrier fluid comprises erucyl bis(2-hydroxyethyl) methyl ammonium chloride.

6. The method of claim 1 wherein the viscoelastic surfactant gel comprises in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 Ito about 4 carbon atoms; $R_3$ is a hydrocarbyl group having from 1 to about 5 carbon atoms; and Y is an electron withdrawing group.

7. The method of claim 6 wherein the viscoelastic surfactant gel comprises a betaine.

8. The method of claim 7 wherein the viscoelastic surfactant gel comprises BET-E40.

9. The method of claim 1 wherein the viscoelastic surfactant gel comprises $CaCl_2$.

10. The method of claim 1, wherein the step of gravel packing is performed above the formation fracture pressure.

11. A method of completing an interval of an open hole wellbore penetrating a subterranean formation comprising the steps of:
   a. drilling the wellbore into the formation with a drill string and an oil-based mud,
   b. pulling out the drill string,
   c. running a sand control string comprising one or more screens, one or more alternate path shunt tubes, and a shroud into the wellbore containing the oil-based mud,
   d. setting a packer at or near the location at which the wellbore penetrates the formation,
   e. displacing at least a portion of the oil-based mud with a non-damaging aqueous fluid insensitive to oil-based mud, up to the packer,
   f. gravel packing with an aqueous viscous viscoelastic surfactant based carrier fluid, said viscoelastic surfactant present in an amount effective to provide viscosity sufficient to carry the gravel, said carrier fluid being insensitive to the at least partially displaced oil-based mud for a time sufficient to place the gravel and said carrier fluid capable of being broken by produced fluid, and
   g. producing fluid from the wellbore.

12. The method of claim 11 wherein the wellbore is horizontal or highly deviated.

13. The method of claim 11 wherein the oil-based mud is an invert emulsion oil-based mud.

14. The method of claim 11 wherein the viscous viscoelastic surfactant based carrier fluid comprises an effective amount of a quaternary ammonium salt of the amine corresponding to the formula wherein $R_1$ is at least about a $C_{16}$ aliphatic group which may be branched or straight chained and which may be saturated or unsaturated, $R_2$, $R_3$, and $R_4$ are each independently, a C, to about $C_6$ aliphatic group which can be branched: or straight chained, saturated or unsaturated and which may be substituted with a group that renders the $R_2$ or $R_3$ group more hydrophilic, none of $R_1$, $R_2$, $R_3$ or $R_4$ is hydrogen, and the $R_2$, $R_3$ and $R_4$ groups may be formed into a heterocyclic 5- or 6-member ring structure which includes the nitrogen atom of the amine, and $X^-$ is an inorganic anion.

15. The method of claim 14 wherein said viscous viscoelastic surfactant based carrier fluid comprises erucyl bis(2-hydroxyethyl) methyl ammonium chloride.

16. The method of claim 11 wherein the viscoelastic surfactant gel comprises in which $R_1$ is a hydrocarbyl group that may be branched or straight chained, aromatic, aliphatic or olefinic and has from about 14 to about 26 carbon atoms and may contain an amine; $R_2$ is hydrogen or an alkyl group having from 1 to about 4 carbon atoms; $R_3$ is a hydrocarbyl group having from 1 to about 5 carbon atoms; and Y is an electron withdrawing group.

17. The method of claim 16 wherein the viscoelastic surfactant gel comprises BET-E-40.

18. The method of claim 11 wherein the viscoelastic surfactant gel comprises $CaCl_2$.

19. The method of claim 11, wherein the step of gravel packing is performed above the formation fracture pressure.

20. The method of claim 11 wherein said non-damaging aqueous fluid insensitive to oil-based mud is selected from the group consisting of an aqueous hydroxyethyl cellulose solution, an aqueous xanthan solution, and an aqueous clarified xanthan solution.

21. The method of claim 11, wherein after the step of displacing at least a portion of the oil-based mud with a non-damaging aqueous fluid insensitive to oil-based mud up to the packer, a non-damaging aqueous fluid insensitive to oil-based mud is used as a pre-pad.

22. A method of completing an interval of an open hole wellbore penetrating a subterranean formation comprising the steps of:
   a. drilling the wellbore into the formation with a drill string and an oil-based mud,
   b. pulling out the drill string,
   c. running a sand control string comprising one or more screens, one or more alternate path shunt tubes, and a shroud into the wellbore containing the oil-based mud, d. setting a packer at or near the location at which the wellbore penetrates the formation, e. injecting a non-damaging aqueous fluid insensitive to oil-based mud as a pre-pad, f. gravel packing with an aqueous viscous viscoelastic surfactant based carrier fluid, said viscoelastic surfactant present in an amount effective to provide viscosity sufficient to carry the gravel, said carrier fluid being insensitive to the at least partially displaced oil-based mud for a time sufficient to place the gravel and said carrier fluid being capable of breaking in the presence of produced fluid, and g. producing fluid from the wellbore.

23. The method of claim 22 wherein said non-damaging aqueous fluid insensitive to oil-based mud is selected from the group consisting of an aqueous hydroxyethyl cellulose solution, an aqueous xanthan solution, and an aqueous clarified xanthan solution.

* * * * *